US012597396B2

(12) United States Patent
Cha et al.

(10) Patent No.: US 12,597,396 B2
(45) Date of Patent: Apr. 7, 2026

(54) LIGHT-EMITTING DIODE (LED) DRIVING CIRCUIT AVOIDING LEAKAGE CURRENT IN SERIES CONNECTED LIGHT-EMITTING GROUPS

(71) Applicants: Hefei BOE Ruisheng Technology Co., Ltd., Hefei (CN); BOE Technology Group Co., Ltd., Beijing (CN)

(72) Inventors: Huangfei Cha, Beijing (CN); Jinling Zhang, Beijing (CN); Lingyun Shi, Beijing (CN); Feifei Wang, Beijing (CN); Wengang Su, Beijing (CN); Kaimin Yin, Beijing (CN); Zhitao Zhang, Beijing (CN); Jiajia Gai, Beijing (CN); Yiding Sun, Beijing (CN)

(73) Assignees: Hefei BOE Ruisheng Technology Co., Ltd., Hefei (CN); BOE Technology Group CO., Ltd., Beijing (CN)

( * ) Notice: Subject to any disclaimer, the term of this patent is extended or adjusted under 35 U.S.C. 154(b) by 81 days.

(21) Appl. No.: 18/280,258

(22) PCT Filed: Nov. 22, 2022

(86) PCT No.: PCT/CN2022/133572
§ 371 (c)(1),
(2) Date: Sep. 4, 2023

(87) PCT Pub. No.: WO2024/108403
PCT Pub. Date: May 30, 2024

(65) Prior Publication Data
US 2025/0087172 A1 Mar. 13, 2025

(51) Int. Cl.
*G09G 3/36* (2006.01)
*G09G 3/34* (2006.01)

(52) U.S. Cl.
CPC ......... *G09G 3/3426* (2013.01); *G09G 3/3688* (2013.01); *G09G 2300/0842* (2013.01);
(Continued)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS

2008/0174529 A1* 7/2008 Lin ...................... G09G 3/3406 345/82
2014/0362130 A1* 12/2014 Duan .................. G09G 3/3241 345/77

(Continued)

*Primary Examiner* — Ke Xiao
*Assistant Examiner* — Nelson Lam
(74) *Attorney, Agent, or Firm* — IPro, PLLC

(57) ABSTRACT

A display device and a driving circuit thereof, and a driving method are provided, belonging to the field of display technologies. In the driving circuit, a light emission control sub-circuit may generate a driving signal and output the same from an output pin, so that a light-emitting unit group emits light based on the driving signal and a power supply signal provided by a power supply terminal. An amplification sub-circuit may amplify a reference power source signal provided by a reference power source terminal to have a voltage not less than a voltage of the power supply signal and transmit the amplified reference power source signal to a low-grayscale control sub-circuit. The low-grayscale control sub-circuit may control a connection and a disconnection between the amplification sub-circuit and the output pin under the control of an enabling control terminal.

20 Claims, 10 Drawing Sheets

(52) U.S. Cl.
CPC ............... *G09G 2310/0248* (2013.01); *G09G 2320/0247* (2013.01); *G09G 2320/0257* (2013.01); *G09G 2320/0646* (2013.01); *G09G 2330/02* (2013.01)

(58) Field of Classification Search
CPC .... G09G 3/3233; G09G 3/3241; G09G 3/325; G09G 3/3258; G09G 3/3266; G09G 3/3275; G09G 3/3283; G09G 3/3291
USPC ....................................................... 345/76–83
See application file for complete search history.

(56) References Cited

U.S. PATENT DOCUMENTS

| | | | | |
|---|---|---|---|---|
| 2015/0042692 | A1* | 2/2015 | Kim | G09G 3/3233 345/82 |
| 2022/0053615 | A1* | 2/2022 | Hao | G09G 3/32 |
| 2022/0122536 | A1* | 4/2022 | Liu | H03K 17/6871 |

* cited by examiner

LIGHT-EMITTING DIODE (LED) DRIVING CIRCUIT AVOIDING LEAKAGE CURRENT IN SERIES CONNECTED LIGHT-EMITTING GROUPS

CROSS-REFERENCE TO RELATED APPLICATIONS

This application is a US national stage of international application No. PCT/CN2022/133572, filed on Nov. 22, 2022, the disclosure of which is herein incorporated by reference in its entirety.

TECHNICAL FIELD

The present disclosure relates to the field of display technologies and in particular, relates to a display device and a driving circuit thereof and a driving method.

BACKGROUND OF THE INVENTION

Miniature light-emitting diodes having a size approximately less than 500 μm are increasingly used significantly in the field of display due to its advantages of smaller size, ultra-high luminance and long service life. For example, they may be used as backlight sources, also known as light-emitting boards, in liquid crystal display (LCD) devices.

SUMMARY OF THE INVENTION

A display device and a driving circuit thereof and a driving method are provided.

In an aspect, a driving circuit is provided. The driving circuit has a power-line communication input pin, a data input pin and an output pin. The driving circuit includes a light emission control sub-circuit, an amplification sub-circuit and a low-grayscale control sub-circuit, wherein the light emission control sub-circuit is respectively coupled to the power-line communication input pin, the data input pin and the output pin, and configured to generate a driving signal based on a power communication signal provided by the power-line communication input pin and an address signal provided by the data input pin and output the driving signal through the output pin, the output pin is configured to be coupled to a first electrode of a light-emitting unit group, and a second electrode of the light-emitting unit group is coupled to a power supply terminal;

the amplification sub-circuit is respectively coupled to a reference power source terminal, a first power source terminal, a second power source terminal and the low-grayscale control sub-circuit, and configured to amplify a reference power source signal provided by the reference power source terminal based on a first power source signal provided by the first power source terminal and a second power source terminal provided by the second power source terminal and transmit the amplified reference power source signal to the low-grayscale control sub-circuit, a voltage of the amplified reference power source signal being not less than a voltage of a power supply signal provided by the power supply terminal; and the low-grayscale control sub-circuit is further respectively coupled to an enabling control terminal and the output pin, and configured to control a connection and a disconnection between the amplification sub-circuit and the output pin based on an enabling control signal provided by the enabling control terminal.

Optionally, the amplification sub-circuit includes a first resistor, a second resistor, a third resistor and an amplifier, wherein one end of the first resistor is coupled to the reference power source terminal and the other end of the first resistor is coupled to a positive input terminal of the amplifier;

one end of the second resistor is coupled to a negative input terminal of the amplifier and the other end of the second resistor is coupled to an output terminal of the amplifier;

one end of the third resistor is coupled to the negative input terminal of the amplifier and the other end of the third resistor is coupled to the second power source terminal; and the output terminal of the amplifier is coupled to the low-grayscale control sub-circuit, and the amplifier is further coupled to the first power source terminal and the second power source terminal.

Optionally, the low-grayscale control sub-circuit includes a switching transistor, wherein a control electrode of the switching transistor is coupled to the enabling control terminal, a first electrode of the switching transistor is coupled to the amplification sub-circuit, and a second electrode of the switching transistor is coupled to the output pin.

Optionally, the switching transistor is an N-type transistor.

Optionally, the driving circuit further has a ground pin, wherein the light emission control sub-circuit is further coupled to a base power source terminal and the ground pin, and configured to generate a driving signal based on the power communication signal, the address signal, a base power source signal provided by the base power source terminal, and a signal provided by the ground pin;

the reference power source terminal is used as the base power source terminal; and the second power source terminal is coupled to the ground pin.

Optionally, the driving circuit further includes a power source providing sub-circuit, wherein the power source providing sub-circuit is respectively coupled to the power-line communication input pin, a signal supply terminal and the first power source terminal and configured to transmit the first power source signal to the first power source terminal based on the power communication signal, and a signal provided by the signal supply terminal, wherein the signal provided by the signal supply terminal is a pulse width modulation signal and a voltage of the first power source signal is not less than the voltage of the amplified reference power source signal.

Optionally, the power source providing sub-circuit includes a plurality of stages of boost units connected in series, wherein each stage of boost unit includes: a first isolation sub-unit, a second isolation sub-unit, a first charge-discharge sub-unit, and a second charge-discharge sub-unit;

in each stage of boost unit, an output terminal of the first isolation sub-unit is respectively coupled to one end of the first charge-discharge sub-unit and an input terminal of the second isolation sub-unit, an output terminal of the second isolation sub-unit is coupled to one end of the second charge-discharge sub-unit, the other end of the first charge-discharge sub-unit is coupled to the signal supply terminal, and the other end of the second charge-discharge sub-unit is grounded; and an input terminal of the first isolation sub-unit in each other stage of boost unit except the first-stage boost unit is coupled to the output terminal of the second isolation sub-unit in a previous-stage boost unit, an input terminal of the first isolation sub-unit in the first-stage boost unit is coupled to the power-line communication input pin, and the output terminal of the second isolation sub-unit in the last-stage boost unit is further coupled to the first power source terminal.

Optionally, each of the first isolation sub-unit and the second isolation sub-unit includes an isolation diode; and each of the first charge-discharge sub-unit and the second charge-discharge sub-unit includes a charge-discharge capacitor.

Optionally, the light emission control sub-circuit, the amplification sub-circuit, the low-grayscale control sub-circuit, and the power source providing sub-circuit are integrated.

In another aspect, a driving method is provided, which is applicable to the driving circuit as described in the above aspect. The method includes:

providing a power communication signal to a power-line communication input pin and an address signal to a data input pin, generating, by a light emission control sub-circuit, a driving signal based on the power communication signal and the address signal, and outputting, by the light emission control sub-circuit, the driving signal through an output pin;

providing a reference power source signal to a reference power source terminal, a first power source signal to a first power source terminal, a second power source signal to a second power source terminal, amplifying, by an amplification sub-circuit, the reference power source signal provided by the reference power source terminal based on the first power source signal and the second power source signal, and transmitting, by the amplification sub-circuit, the amplified reference power source signal to a low-grayscale control sub-circuit;

determining whether to control a light-emitting board including a light-emitting unit group to enter a black-frame insertion state or not;

if it is determined that the light-emitting board is controlled to enter the black-frame insertion state, providing an enabling control signal at a first potential to an enabling control terminal, and controlling, by the low-grayscale control sub-circuit, in response to the enabling control signal at the first potential, a connection between the amplification sub-circuit and the output pin to be turned on, so that the amplified reference power source signal is transmitted to the output pin; and if it is determined that the light-emitting board is not controlled to enter the black-frame insertion state, providing an enabling control signal at a second potential to the enabling control end, and controlling, by the low-grayscale control sub-circuit, in response to the enabling control signal at the second potential, the connection between the amplification sub-circuit and the output pin to be turned off.

Optionally, said generating, by the light emission control sub-circuit, the driving signal based on the power communication signal and the address signal includes:

generating, by the light emission control sub-circuit, a pulse width modulation signal and a luminance control signal based on the power communication signal and the address signal, and generating, by the light emission control sub-circuit, the driving signal based on the pulse width modulation signal and the luminance control signal;

the light emission control sub-circuit has a clock signal with a fixed duty ratio; and said determining whether to control the light-emitting board including the light-emitting unit group to enter the black-frame insertion state or not includes:

if the pulse width modulation signal generated by the light emission control sub-circuit is at the second potential within a plurality of cycles of the clock signal, determining that the light-emitting board including the light-emitting unit group is controlled to enter the black-frame insertion state.

Optionally, the number of the plurality of cycles is greater than or equal to 5.

In still another aspect, a display device is provided, the display device includes a display panel, a light-emitting board disposed on one side of the display panel, and the driving circuit as described in the above aspect, wherein the light-emitting board includes a light-emitting unit group; and the driving circuit is coupled to the light-emitting unit group and configured to drive the light-emitting unit group to emit light.

Optionally, the light-emitting board includes a plurality of light-emitting unit groups, each of the light-emitting unit groups including a plurality of light-emitting elements connected in series; and the display device includes a plurality of driving circuits in one-to-one correspondence with the plurality of light-emitting unit groups, wherein an output pin of each of the driving circuits is coupled to first electrodes of the plurality of light-emitting elements connected in series in a corresponding light-emitting unit group, second electrodes of the plurality of light-emitting elements connected in series in each light-emitting unit group are coupled to a power supply terminal, and the plurality of light-emitting elements connected in series is configured to emit light based on a driving signal output by the output pin of the driving circuit and a power supply signal provided by the power supply terminal.

Optionally, the light-emitting element includes a mini light-emitting diode (mini LED).

BRIEF DESCRIPTION OF DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DETAILED DESCRIPTION

For clearer descriptions of the objectives, technical solutions and advantages of the present disclosure, the embodiments of the present disclosure are further described in detail below in combination with the accompanying drawings.

In the related art, an LCD device generally includes an LCD panel, a light-emitting board disposed on one side of the LCD panel and including a plurality of light-emitting elements, and at least one driving circuit for driving the light-emitting board to emit light. The driving circuit is coupled to negative electrodes of the light-emitting elements in the light-emitting board and configured to transmit a driving signal to cathodes of the light-emitting elements. Positive electrodes of the light-emitting elements in the light-emitting board are coupled to a power supply terminal and the light-emitting board may emit light based on the driving signal and a power supply signal provided by the power supply terminal.

However, due to limitation of factors such as process conditions and electrical properties of components, an inherent leakage current exists in the driving circuit. When the driving circuit drives the light-emitting board to enter a black-frame insertion state, once the leakage current is greater than a starting current for turning on the light-emitting element in the light-emitting board, the light-emitting board will have the phenomenon of low-luminance display, resulting in the problem of poor display of the LCD panel. The embodiments of the present disclosure provide a novel driving circuit which can solve the problem of poor display of the LCD panel.

Figure 1:
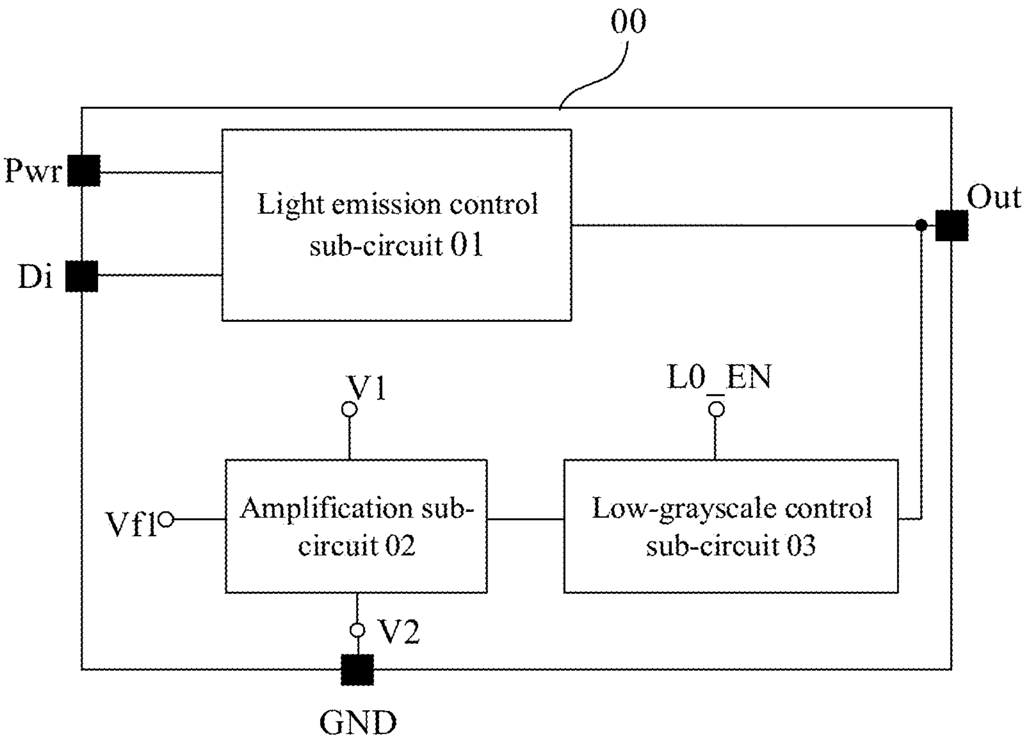
FIG. 1 is a structural schematic diagram of a driving circuit according to an embodiment of the present disclosure.

FIG. 1 is a structural schematic diagram of a driving circuit according to an embodiment of the present disclosure. As shown in FIG. 1, the driving circuit 00 has a power-line communication input pin Pwr, a data input pin Di and an output pin Out. The driving circuit 00 includes a light emission control sub-circuit 01, an amplification sub-circuit 02 and a low-grayscale control sub-circuit 03.

The light emission control sub-circuit 01 is coupled (i.e., electrically connected) to the power-line communication input pin Pwr, the data input pin Di and the output pin Out. The light emission control sub-circuit 01 is configured to generate a driving signal (such as a driving current) based on a power communication signal provided by the power-line communication input pin Pwr and an address signal provided by the data input pin Di and output the driving signal through the output pin Out. The power communication signal may include a power supply voltage, such as 4.5 V.

Figure 2:
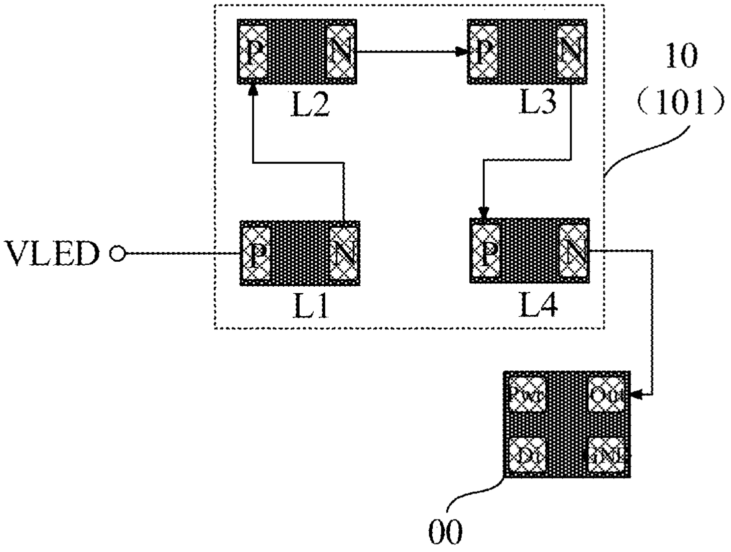
FIG. 2 is a structural schematic diagram of a light-emitting board and a driving circuit thereof according to an embodiment of the present disclosure.

In the embodiments of the present disclosure, in conjunction with FIG. 2, it can be seen that the output pin Out of the driving circuit 00 may be configured to be coupled to a first electrode of a light-emitting unit group 101 and a second electrode of the light-emitting unit group 101 may also be coupled to a power supply terminal VLED. The light-emitting unit group 101 may include a plurality of light-emitting elements connected in series, and FIG. 2 schematically shows four light-emitting elements L1, L2, L3, and L4, which are sequentially connected in series. The first electrode of the light-emitting unit group 101 may refer to negative (N) electrodes of the plurality of included light-emitting elements connected in series. For example, the negative electrode N of the light-emitting element L4 in FIG. 2 may be coupled to the output pin Out of the driving circuit 00 as the first electrode of the light-emitting unit group 101. The second electrode of the light-emitting unit group 101 may refer to positive (P) electrodes of the plurality of included light-emitting elements connected in series. For example, the positive electrode P of the light-emitting element L1 in FIG. 2 may be coupled to the power supply terminal VLED as the second electrode of the light-emitting unit group 101. On this basis, it can be seen that outputting the driving signal through the output pin Out may represent that the driving signal flows to the light-emitting unit group 101 from the output pin Out, or that the driving signal flows into the output pin Out from the light-emitting unit group 101, with no specific current direction restrictions. Correspondingly, the plurality of light-emitting elements connected in series in the light-emitting unit group 101 may emit light based on a power supply signal provided by the power supply terminal VLED and the driving signal output from the output pin Out.

Optionally, the light-emitting element described in the embodiments of the present disclosure may be a mini light-emitting diode (mini LED).

Figure 3:
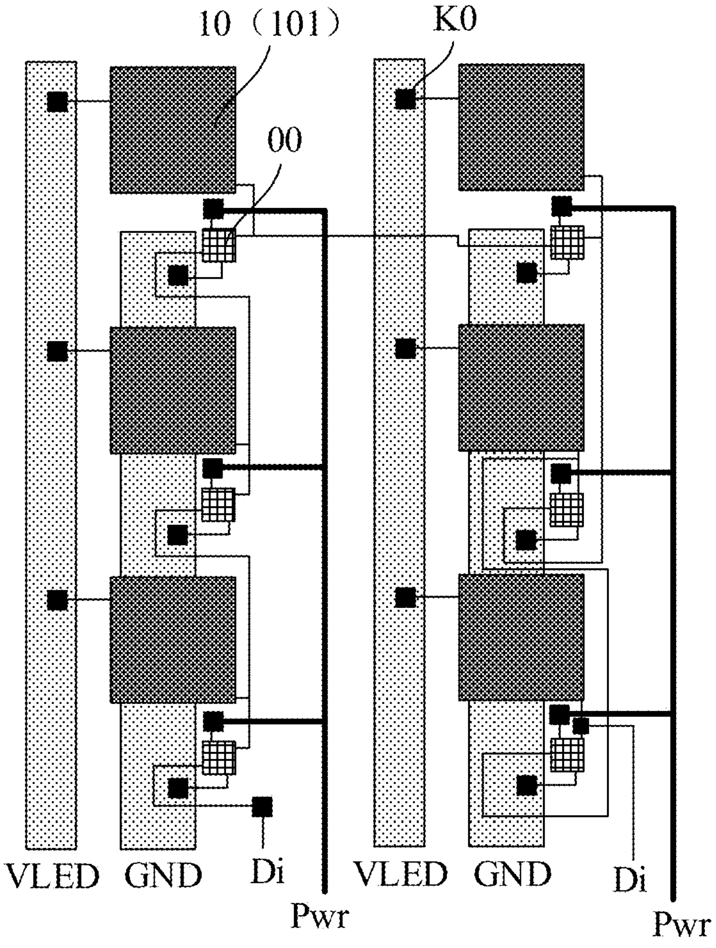
FIG. 3 is a structural schematic diagram of a light-emitting unit group in a light-emitting board according to an embodiment of the present disclosure.

Optionally, with reference to FIG. 3, which shows a light-emitting board 10, the light-emitting board 10 may include a plurality of light-emitting unit groups 101. Correspondingly, a display device may include a plurality of driving circuits 00 in one-to-one correspondence with the plurality of light-emitting unit groups 101. Each driving circuit 00 may drive the corresponding light-emitting unit group 101 to emit light, and an area where one light-emitting unit group 101 is disposed may be referred to as one single light-emitting area.

It should be noted that in conjunction with FIG. 3, the power supply terminal VLED, a ground terminal GND, the power-line communication input pin Pwr and other parts, the light-emitting unit group 101 in the light-emitting board 10, and the driving circuit 00 may be disposed on different layers. For example, by taking that different filling patterns represent different layers as an example, the power supply terminal VLED, the ground terminal GND, the power-line communication input pin Pwr and other parts shown in FIG. 3 may be disposed on the same layer. The light-emitting unit group 101 may be disposed on another layer. The driving circuit 00 may be disposed on still another layer. On this basis, an insulation layer may be disposed between respective parts on different layers, and a via K0 as shown in FIG. 3 is formed in the insulation layer to facilitate transition between different layers, so that the respective parts on different layers may be reliably coupled to one another.

It should also be noted that the light emission control sub-circuit 01 may be configured to generate a pulse width modulation signal and a luminance control signal based on the power communication signal provided by the power-line communication input pin Pwr and the address signal provided by the data input pin Di, and generate the driving signal (such as the driving current) based on the pulse width modulation signal and the luminance control signal. The pulse width modulation signal may be configured to control the duty ratio of the generated driving signal, and the luminance control signal may be configured to control the amplitude of the generated driving signal, thereby adjusting the luminance of the light-emitting unit group 101. On this basis, it can be seen that if it is necessary to control the display panel to display a black picture (also known as an L0 picture), the duty ratio of the PWM signal may be adjusted to 0% to make the light-emitting board including the plurality of light-emitting unit groups 101 enter a black-frame insertion state, so that the display panel displays the L0 picture.

However, in a current display device, due to limitations of factors such as process conditions and circuit characteristics, the driving circuit 00 has a leakage current of about 5 nA in a standby state. The leakage current may be understood as a tiny current that flows through a P-N junction of a transistor in the driving circuit 00 when it is turned off. When the L0 picture is displayed, if the leakage current of the driving circuit 00 corresponding to certain light-emitting unit group 101 flows through the plurality of light-emitting elements connected in series, a leakage current loop is formed. Once the leakage current is greater than the starting current (about 2 nA) required to turn on the plurality of light-emitting elements connected in series, a positive voltage difference exists between the positive electrode (i.e. P electrode) and the negative electrode (i.e. N electrode), that is, Vp (a voltage of the positive electrode)−Vn (a voltage of the negative electrode)>0, so that the single light-emitting area where the light-emitting unit group 101 is disposed exhibits L0 low-luminance and the display panel cannot reliably display the L0 picture, but shows low-luminance display. If each of the plurality of light-emitting unit groups 101 has this leakage current loop, the display panel has the phenomenon of poor and abnormal display, such as a snowflake screen. The embodiments of the present disclosure provide a driving circuit. This circuit may change the voltage difference between the positive electrode and the negative electrode when the L0 picture is displayed, so that Vp−Vn≤0 to solve the problem of the snowflake screen.

With continued reference to FIG. 1, it can be seen that the amplification sub-circuit 02 is coupled to a reference power source terminal Vf1, a first power source terminal V1, a second power source terminal V2 and the low-grayscale control sub-circuit 03. The amplification sub-circuit 02 is configured to amplify a reference power source signal provided by the reference power source terminal Vf1 based on a first power source signal provided by the first power source terminal V1 and a second power source signal provided by the second power source terminal V2 and transmit the amplified reference power source signal to the low-grayscale control sub-circuit 03. In addition, the voltage of the amplified reference power source signal, i.e., a potential transmitted to the low-grayscale control sub-circuit 03, is not less than (greater than or equal to) a voltage of the power supply signal provided by the power supply terminal VLED.

The low-grayscale control sub-circuit 03 is further coupled to an enabling control terminal L0_EN and the output pin Out. The low-grayscale control sub-circuit 03 is configured to control the on-off between the amplification sub-circuit 02 and the output pin Out based on an enabling control signal provided by the enabling control terminal L0 EN.

For example, in the embodiments of the present disclosure, when the display panel displays the L0 picture, the enabling control terminal L0_EN may be controlled to provide an enabling control signal at a first potential, and when the display panel does not display the L0 picture, the enabling control terminal L0_EN may be controlled to provide an enabling control signal at a second potential.

The low-grayscale control sub-circuit 03 may control the connection between the amplification sub-circuit 02 and the output pin Out to be turned on when a potential of the enabling control signal provided by the enabling control terminal L0_EN is the first potential, that is, when the display panel displays the L0 picture. In this case, the reference power source signal amplified by the amplification sub-circuit 02 may be transmitted to the output pin Out. As the voltage of the amplified reference power source signal is greater than the voltage of the power supply signal provided by the power supply terminal VLED, in combination with the descriptions in the above embodiments, it can be seen that in this case, the voltage Vn transmitted to the negative electrodes of the plurality of light-emitting elements connected in series in the light-emitting unit group 101 is greater than or equal to the voltage Vp of the positive electrodes thereof, that is, Vp−Vn≤0. In this way, when the L0 picture is displayed, it is possible to avoid the situation that the light-emitting unit group 101 is turned on as the leakage current flows through the plurality of light-emitting elements connected in series, thereby avoiding the problem of the snowflake screen.

In addition, the low-grayscale control sub-circuit 03 may control the connection between the amplification sub-circuit 02 and the output pin Out to be turned off when the potential of the enabling control signal provided by the enabling control terminal L0_EN is the second potential, that is, when the display panel does not display the L0 picture. In this case, the reference power source signal amplified by the amplification sub-circuit 02 is not transmitted to the output pin Out and the driving signal generated by the light emission control sub-circuit 01 may be reliably output through the output pin Out, so that the plurality of light-emitting elements connected in series in the light-emitting unit group 101 can reliably emit light. On this basis, the amplification sub-circuit 02 and the low-grayscale control sub-circuit 03 may be collectively referred to as a high-voltage injection control loop.

Optionally, in the embodiments of the present disclosure, the first potential may be an effective potential, the second potential may be an ineffective potential, and the first potential may be a high potential relative to the second potential. Certainly, in some other embodiments, the first potential may also be a low potential relative to the second potential for example. It should be noted that the first potential and the second potential only represent that the potential of the signal has two state quantities, instead of representing that the first potential or the second potential has a specific value.

In summary, the embodiments of the present disclosure provide a driving circuit. The driving circuit includes the light emission control sub-circuit, the amplification sub-circuit and the low-grayscale control sub-circuit. The light emission control sub-circuit may generate the driving signal and output the same from the output pin, so that the light-emitting unit group coupled to the output pin emits light based on the driving signal and the power supply signal provided by the power supply terminal. The amplification sub-circuit may amplify the reference power source signal provided by the reference power source terminal to have a voltage not less than the potential of the power supply signal and transmit the amplified reference power source signal to the low-grayscale control sub-circuit. The low-grayscale control sub-circuit may control a connection and a disconnection between the amplification sub-circuit and the output pin under the control of the enabling control terminal. In this way, by flexibly setting the signal provided by the enabling control terminal, when the light-emitting board including the light-emitting unit group enters the black-frame insertion state, the amplified reference power source signal can be further transmitted to the light-emitting unit group, so that the voltage of the first electrode of the light-emitting unit group is greater than the voltage of the second electrode thereof and the light-emitting unit group cannot emit light. Thus, the light-emitting board is prevented from having the phenomenon of low-luminance display and it can be ensured that the display panel has a relatively good display effect.

In conjunction with FIG. 2 and FIG. 3, it can further be seen that the light emission control sub-circuit 01 may further has a ground pin GND. The light emission control sub-circuit 01 may further be coupled to the ground pin GND and a base power source terminal and may be configured to generate a driving signal based on the power communication signal, the address signal, a base power source signal provided by the base power source terminal, and a signal provided by the ground pin GND.

On this basis, it can be seen that in an example of the embodiments of the present disclosure, the reference power source terminal Vf1 may be used as the base power source terminal, and the second power source terminal V2 may be coupled to the ground pin GND.

It should be noted that in the embodiments of the present disclosure, the driving circuit 00 may operate at various modes which at least include an addressing mode, a configuration mode and an operating mode. During the addressing mode, each driving circuit 00 may be assigned a unique address and the address may be configured to broadcast additional commands and data in the configuration mode and the operating mode. During the configuration mode, the driving circuit 00 may be configured through one or more operating parameters (such as an overcurrent threshold, an overvoltage threshold, a clock-frequency-dividing ratio, and/or conversion rate control). During the operating mode, control data may be provided to the driving circuit 00, which enables the driving circuit 00 to control a current to the light-emitting unit group 101, thereby controlling the luminance of light emitted by the light-emitting unit group 101. In other embodiments, operating modes of the display device may include additional, less or different operating modes. For example, the operating modes may include an initialization mode and a shutdown mode.

Figure 4:
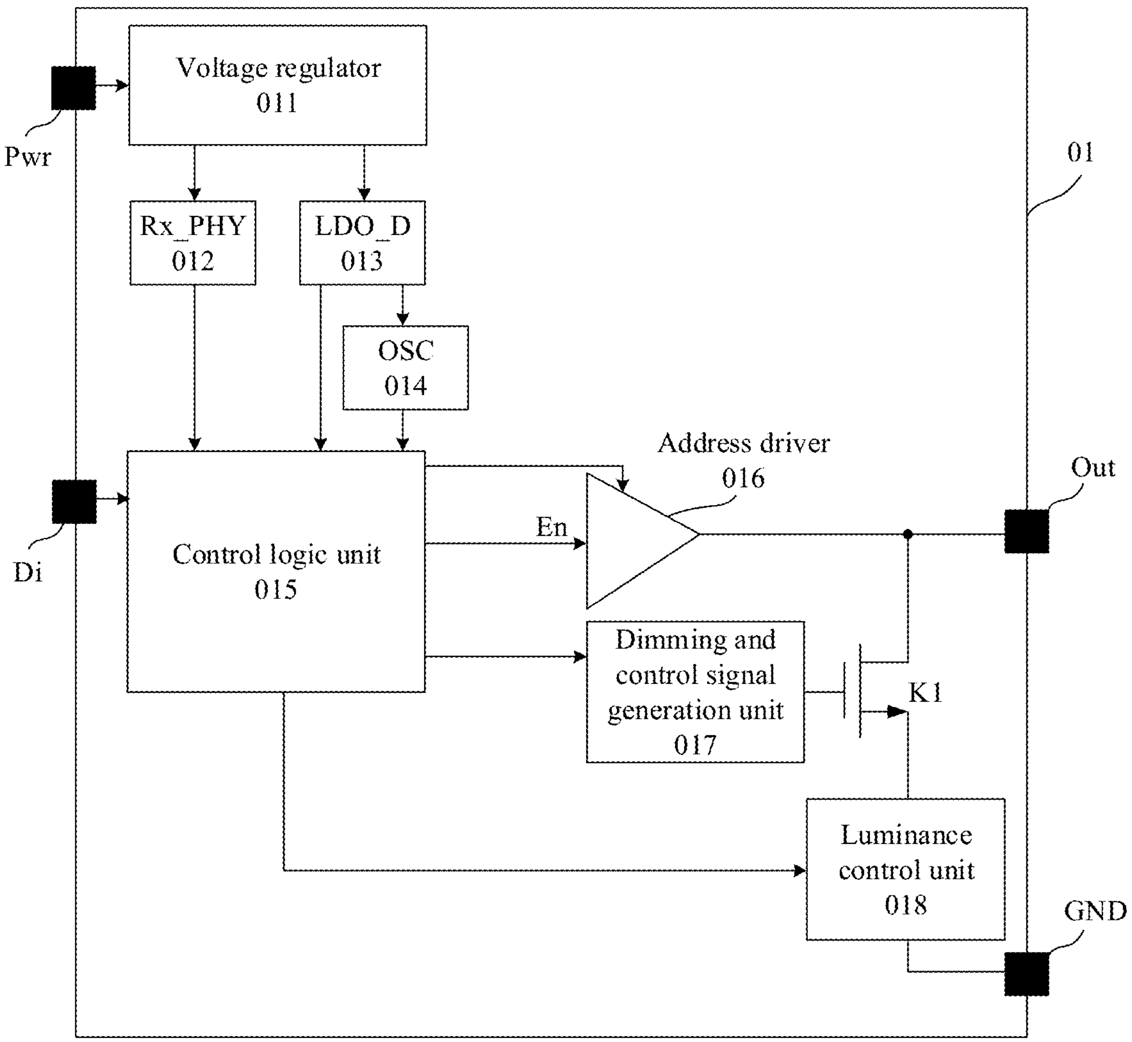
FIG. 4 is a structural schematic diagram of a light emission control sub-circuit according to an embodiment of the present disclosure.

FIG. 4 is a structural schematic diagram of a light emission control sub-circuit according to an embodiment of the present disclosure. As shown in FIG. 4, the light emission control sub-circuit 01 may include a voltage regulator 011, a physical layer Rx_PHY 012, a low-dropout regulator LDO_D 013, an oscillator (OSC) 014, a control logic unit 015, an address driver 016, a dimming and control signal generation unit 017, a luminance control unit 018 and a switching tube K1. In other embodiments, the light emission control sub-circuit 01 may further include additional, less or different components.

The voltage regulator 011 may be coupled to the power-line communication input pin Pwr and may further be coupled to the physical layer Rx_PHY 012 and the low-dropout regulator LDO_D 013. The low-dropout regulator LDO_D 013 may further be coupled to the OSC 014. The low-dropout regulator LDO_D, the OSC 014 and the physical layer Rx_PHY 012 may all be coupled to the control logic unit 015. The control logic unit 015 may further be coupled to the address driver 016, the dimming and control signal generation unit 017 and the luminance control unit 018. The address driver 016 may further be coupled to a first electrode of the switching tube K1 and the first electrode of the switching tube K1 may further be coupled to the output pin Out. The dimming and control signal generation unit 017 may further be coupled to a gate of the switching tube K1. A second electrode of the switching tube K1 may be coupled to the luminance control unit 018. The luminance control unit 018 may be coupled to the ground pin GND.

On the basis of the above coupling, the voltage regulator 011 may demodulate the power communication signal received from the power-line communication input pin Pwr into a power supply voltage and digital data. The power supply voltage represents a DC component of the power communication signal, and the digital data represents a modulation component of the power communication signal. In an exemplary embodiment, the voltage regulator 011 includes a first-order RC filter following an active follower. The digital data may be provided to the physical layer Rx_PHY 012 connected between the voltage regulator 011 and the control logic unit 015. The physical layer Rx_PHY 012 may provide a connection with the maximum bandwidth of 2 MHz with 36 cascades. The power supply voltage may be provided to the low-dropout regulator LDO_D 013. The low-dropout regulator LDO_D 013 may convert the power supply voltage to a stable DC voltage for providing power for the oscillator OSC 014, the control logic unit 015 and other components, and the low-dropout regulator LDO_D 013 may decrease the voltage gradually. In an exemplary embodiment, the stable DC voltage may be 1.8V. The oscillator OSC 014 may also provide a clock signal DCLK. In an exemplary embodiment, the maximum frequency of the clock signal DCLK may be about 10.7 MHz.

The control logic unit 015 may receive the digital data from the physical layer Rx_PHY 012, the DC voltage from the low-dropout regulator LDO_D 013, and the clock signal DCLK from the oscillator OSC 014. Depending on the operating mode of the display device, the control logic unit 015 may output an enabling signal En and an incremental data signal Inc_data to the address driver 016, the maximum current signal Max Current to the luminance control unit 018, and a clock selection signal PWM CLK_sel to the dimming and control signal generation unit 017. For example, during the addressing mode, the logic control unit 015 may activate the enabling signal En to start the address driver 016. The address driver 016 receives an incoming address signal via the data input pin Di and stores the address, and the incremental data signal Inc_data representing an outgoing address is provided to the address driver 016. In the case that the enabling signal En is activated during the addressing mode, the address driver 016 may cache the incremented data signal Inc_data to the output pin Out. The control logic unit 015 may control the dimming and control signal generation unit 017 to transmit a turn-off signal to the switching tube K1 during the addressing mode so as to reliably turn off the transistor K1, thereby effectively blocking a current path from the light-emitting element.

During the operating mode and the configuration mode, the control logic unit 015 may deactivate the enabling signal En and the output of the address driver 360 may be tristate output so as to effectively decouple it from the output pin Out. During the operating mode, the clock selection signal PWM CLK_sel may specify a duty ratio used by the dimming and control signal generation unit 017 to control the PWM signal. Based on the selected duty ratio, the dimming and control signal generation unit 017 may control the timing of a conduction (turn-on) state and a non-conduction (turn-off) state of the transistor K1. During the conduction state of the transistor K1, a current path from the output pin Out to the ground pin GND through the transistor K1 is established. In addition, the luminance control unit 018 may collect driver currents through the light-emitting unit group 101. During the non-conduction state of the transistor K1, the current path is interrupted to block the current from flowing through the light-emitting unit group 101. When the transistor M1 is in the conduction state, the luminance control unit 018 may receive the maximum current signal Max Current from the control logic unit 015 and control a level of the current flowing through the light-emitting unit group 101. During the operating mode, the control logic unit 015 may control the duty ratio of the dimming and control signal generation unit 017 and the maximum current Max Current of the luminance control unit 018 so as to set the light-emitting unit group 101 to have the desired luminance.

Figure 5:
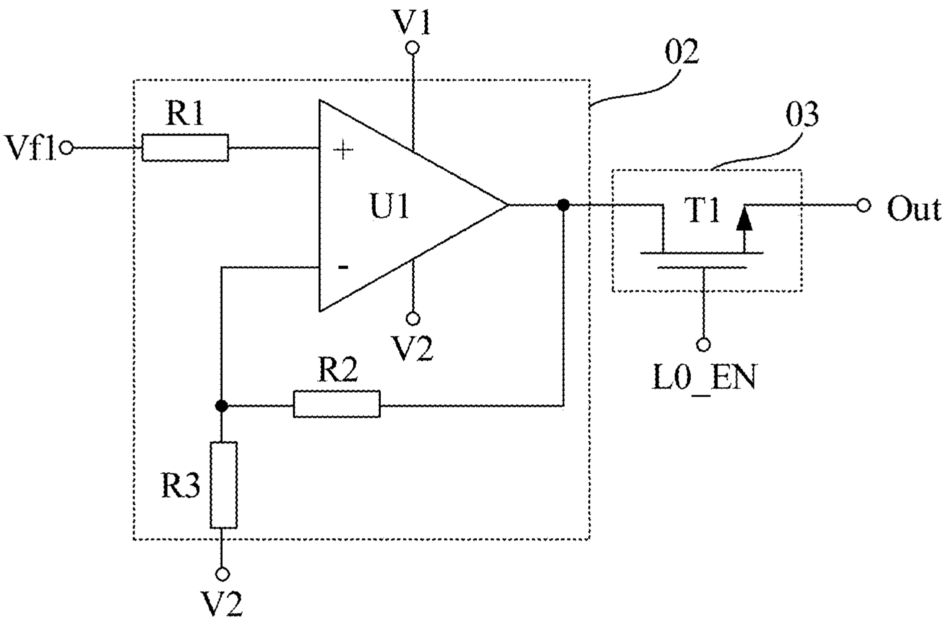
FIG. 5 is a structural schematic diagram of an amplification sub-circuit and a low-grayscale control sub-circuit according to an embodiment of the present disclosure.

FIG. 5 is a structural schematic diagram of part of circuits in a driving circuit according to an embodiment of the present disclosure. As shown in FIG. 5, the amplification sub-circuit 02 may include a first resistor R1, a second resistor R2, a third resistor R3 and an amplifier U1. The amplifier U1 may be an operational amplifier.

One end of the first resistor R1 may be coupled to the reference power source terminal Vf1 and the other end of the first resistor R1 may be coupled to a positive input terminal of the amplifier U1.

One end of the second resistor R2 may be coupled to a negative input terminal of the amplifier U1 and the other end of the second resistor R2 may be coupled to an output terminal of the amplifier U1.

One end of the third resistor R3 may be coupled to the negative input terminal of the amplifier U1 and the other end of the third resistor R3 may be coupled to the second power source terminal V2.

The output terminal of the amplifier U1 may be coupled to the low-grayscale control sub-circuit 03 and the amplifier U1 may further be coupled to the first power source terminal V1 and the second power source terminal V2.

In an exemplary embodiment, a benchmark voltage in the light emission control sub-circuit 01 is generally 2.5 V, that is, a potential of the base power source signal provided by the base power source terminal Vf2 is 2.5 V. Correspondingly, it can be seen that a potential of the reference power source signal provided by the reference power source terminal Vf1 used as the base power source terminal Vf2 may also be 2.5 V.

On the basis of FIG. 5, according to the principle of virtual short and virtual break of the amplifier U1, it can be seen that the amplified potential transmitted to the low-grayscale control sub-circuit 03, i.e., the potential Vout ultimately transmitted to the output pin Out, may satisfy:

$$Vout = \frac{r2 + r3}{r3} * Vf10 = \left(1 + \frac{r2}{r3}\right) Vf10, \qquad \text{formula (1)}$$

where r2 refers to a resistance value of the second resistor R2, r3 refers to a resistance value of the third resistor R3, and Vf10 refers to the potential of the reference power source signal provided by the reference power source terminal Vf1. Based on the above formula (1), it can be seen that the required amplification function may be achieved by flexibly setting the resistance values of the second resistor R2 and the third resistor R3.

For example, assuming that the potential of the power supply signal transmitted by the power supply terminal VLED to the positive electrodes (i.e., P electrodes) of the plurality of the light-emitting elements connected in series in the light-emitting unit group 101 is 25V and the starting current of the plurality of the light-emitting elements connected in series in the light-emitting unit group 101 is 2 nA, in order to make the voltage of the negative electrode (N electrode) greater than or equal to the voltage of the P electrode, the potential transmitted to the output pin Out may increase to be greater than or equal to 25V. Again, assuming that the potential of the reference power source signal is 2.5 V, it can be seen that the amplification factor of the amplification sub-circuit 02 needs to be 10 times. That is, by setting the resistance value of the second resistor R2 to 9 times the resistance value of the third resistor R3, the amplification sub-circuit 02 may reliably amplify the reference power source signal from 2.5V to 25V. By increasing the resistance value of the second resistor R2 continuously or simultaneously increasing the resistance value of the second resistor R2 and the resistance value of the third resistor R3, or decreasing the resistance value of the third resistor R3, the amplification sub-circuit 02 may amplify the reference power source signal from 2.5V to 25V. In this way, it can be seen that the voltage difference between the P electrode and the N electrode may be less than or equal to 0, that is, $Vp-Vn \leq 0$. Thus, the plurality of light-emitting elements connected in series in the light-emitting unit group 101 cannot emit light, thereby solving the problem of the snowflake screen of the display panel.

With continued reference to FIG. 5, it can be seen that the low-grayscale control sub-circuit 03 described in the embodiments of the present disclosure may include a switching transistor T1.

A control electrode of the switching transistor T1 may be coupled to the enabling control terminal L0_EN, a first electrode of the switching transistor T1 may be coupled to the amplification sub-circuit 02, and a second electrode of the switching transistor T1 may be coupled to the output pin Out. For example, the first electrode of the switching transistor T1 may be coupled to the output terminal of the amplifier U1.

Optionally, the transistor may be a thin film transistor or a field-effect transistor or other devices having the same properties. Since a source and a drain of the transistor are symmetrical, the source and the drain of the transistor are interchangeable. Correspondingly, it can be seen that in the first electrode and the second electrode of the transistor described in the embodiments of the present disclosure, one electrode may be the source and the other electrode may be the drain. In addition, according to the form in the figure, it is specified that a middle terminal of the transistor is the control electrode, which may also be called a gate. Furthermore, the transistor used in the embodiments of the present disclosure may be either a P-type transistor or an N-type transistor. The P-type transistor is turned on when the gate is at a low potential and is turned off when the gate is at a high potential, and the N-type transistor is turned on when the gate is at the high potential and is turned off when the gate is at the low potential.

For example, the switching transistor T1 described in the embodiments of the present disclosure may be the N-type transistor. Correspondingly, as described in the above embodiments, the first potential of the enabling control signal may be the high potential relative to the second potential. Certainly, if the switching transistor T1 is the P-type transistor, the first potential of the enabling control signal may be the low potential relative to the second potential. The embodiments of the present disclosure are described by taking that the switching transistor T1 is the N-type transistor as an example.

By taking that the switching transistor T1 is the N-type transistor as an example, in conjunction with FIG. 5, it can be seen that when the display panel displays the L0 picture, the enabling control signal at the high potential may be provided to the enabling control terminal L0_EN. In this case, the switching transistor T1 may be turned on. The reference power source signal may be proportionally amplified and the reference power source signal is transmitted to the N electrodes of the plurality of light-emitting elements connected in series in the light-emitting unit group 101 through the turned-on switching transistor T1. In addition, in this case, the voltage of the signal transmitted to the N electrodes is greater than or equal to the voltage of the power supply signal received by the P electrodes, so that the plurality of light-emitting elements connected in series cannot emit light, thereby solving the problem of the snowflake screen of the display panel. When the display panel does not display the L0 picture, the enabling control signal at the low potential may be provided to the enabling control terminal L0_EN. In this case, the switching transistor T1 may be turned off, and the N electrodes of the plurality of light-emitting elements connected in series in the light-emitting unit group 101 may normally receive the driving signal generated by the light emission control sub-circuit 01, and reliably emit light based on the driving signal.

It should be noted that according to the working characteristics of the amplifier U1, it can be seen that it can be ensured that the reference power source signal provided by the reference power source terminal Vf1 is reliably amplified only when the voltage of the first power source signal provided by the first power source terminal V1 is high enough. At present, the power supply voltage inside the driving circuit 00, i.e., the maximum voltage Vpwr provided by the power-line communication input pin Pwr, is generally about 4.5V, and if the Vpwr of about 4.5V is directly transmitted to the first power source terminal V1 (that is, it is set that the first power source terminal V1 is directly coupled to the power-line communication input pin Pwr) as the first power source signal, it can be seen that the amplification capacity of the amplification sub-circuit 02 is relatively low and thus the amplification sub-circuit 02 cannot reliably amplify the reference power source signal to a potential greater than the potential (such as 25V) of the power supply signal provided by the power supply terminal. For this purpose, with reference to the structural schematic diagram of another driving circuit shown in FIG. 6, it can be seen that the driving circuit 00 described in the embodiments of the present disclosure may further include a power source providing sub-circuit 04.

The power source providing sub-circuit 04 may be coupled to the power-line communication input pin Pwr, a signal supply terminal Pwm and the first power source terminal V1. The power source providing sub-circuit 04 may be configured to transmit the first power source signal to the first power source terminal V1 based on the power communication signal and the PWM signal.

A signal provided by the signal supply terminal Pwm may be a pulse width modulation signal. The voltage of the first power source signal is not less than (i.e., greater than or equal to) the voltage of the amplified reference power source signal. That is, the power source providing sub-circuit 04 may boost the potential based on the power communication signal provided by the power-line communication input pin Pwr and the pulse width modulation signal provided by the signal supply terminal Pwm and transmit the boosted signal to the first power source terminal V1. Correspondingly, the power source providing sub-circuit 04 may also be called as a boost circuit.

For example, assuming that as described in the above embodiments, the voltage transmitted to the low-grayscale control sub-circuit 03 by the amplification circuit 02 is 25 V, the voltage of the first power source signal transmitted to the first power source terminal V1 by the power source providing sub-circuit 04 may be greater than or equal to 25 V, thereby ensuring that the amplification sub-circuit 02 reliably amplifies the reference power source signal of about 2.5 V to the required 25 V based on the first power source signal.

Figure 6:
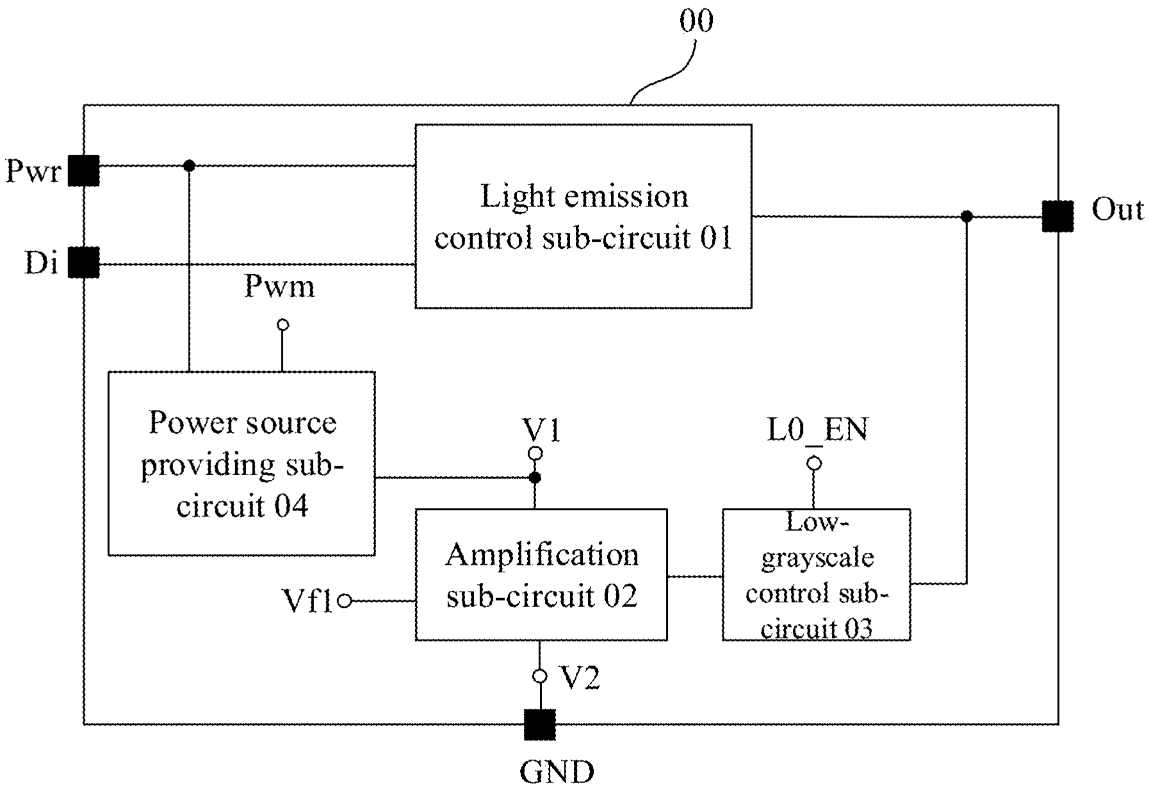
FIG. 6 is a structural schematic diagram of another driving circuit according to an embodiment of the present disclosure.
Figure 7:
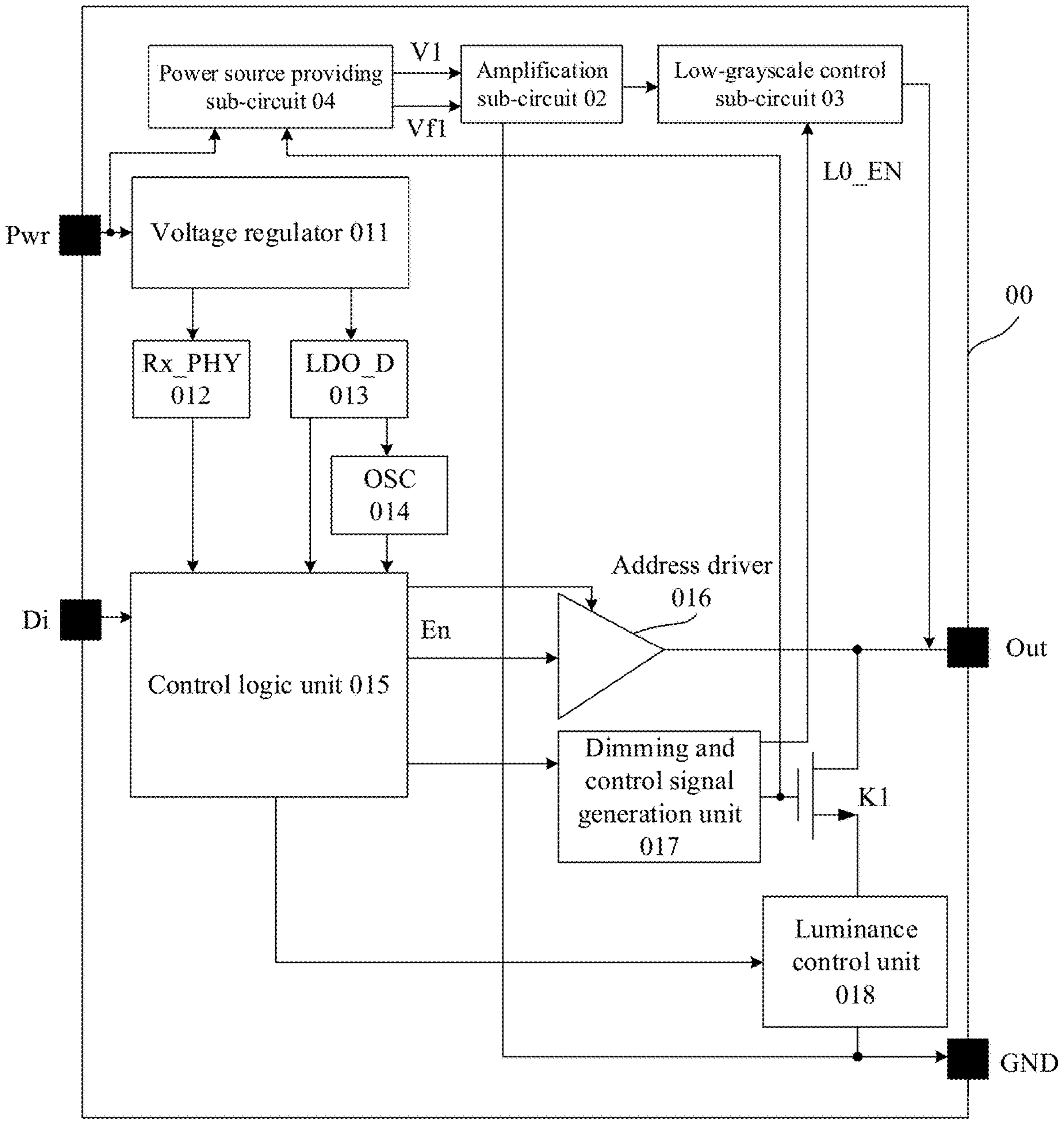
FIG. 7 is a structural schematic diagram of still another driving circuit according to an embodiment of the present disclosure.

Optionally, on the basis of the light emission control sub-circuit 01 shown in FIG. 5, FIG. 7 shows a structural schematic diagram of still another driving circuit. As shown in FIG. 7, the power source providing sub-circuit 04 may be coupled to the dimming and control signal generation unit 017 in the light emission control sub-circuit 01 to directly receive the pulse width modulation signal from the dimming and control signal generation unit 017. Alternatively, as shown in FIG. 6, the signal supply terminal Pwm may be a separate signal terminal independent of the light emission control sub-circuit 01. In addition, with reference to FIG. 7, it can further be seen that the reference power source terminal Vf1 coupled to the amplification sub-circuit 02 may also be coupled to the power source providing sub-circuit 04. Correspondingly, it can be seen that the power source providing sub-circuit 04 may further generate a reference power source signal and provide the same to the amplification sub-circuit 02. The enabling control terminal L0_EN coupled to the low-grayscale control sub-circuit 03 may also be coupled to the dimming and control signal generation unit 017 to receive the enabling control signal from the dimming and control signal generation unit 017. In other words, the dimming and control signal generation unit 017 may also be configured to generate the enabling control signal.

Figure 8:
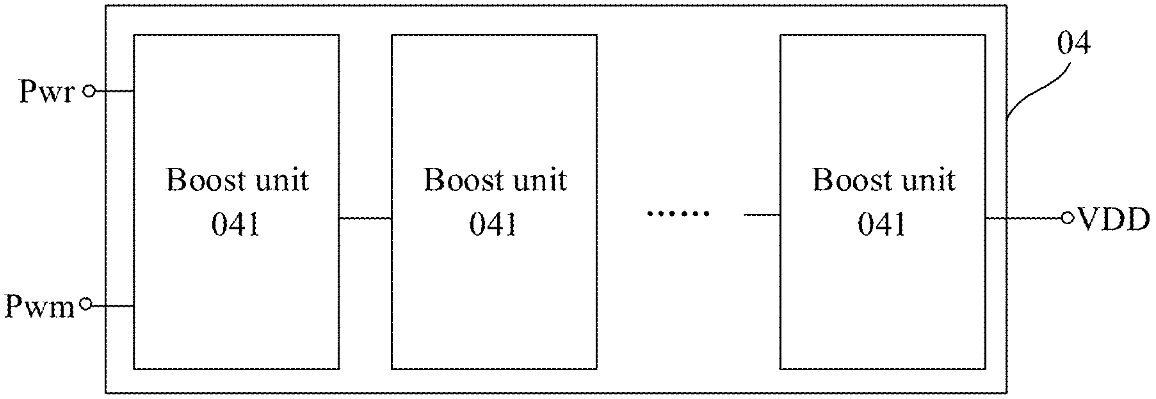
FIG. 8 is a structural schematic diagram of a power source providing sub-circuit according to an embodiment the present disclosure.

FIG. 8 is a structural schematic diagram of a power source proving sub-circuit according to an embodiment the present disclosure. As shown in FIG. 8, the power source providing sub-circuit 04 may include a plurality of stages of boost units connected in series 041.

Figure 9:
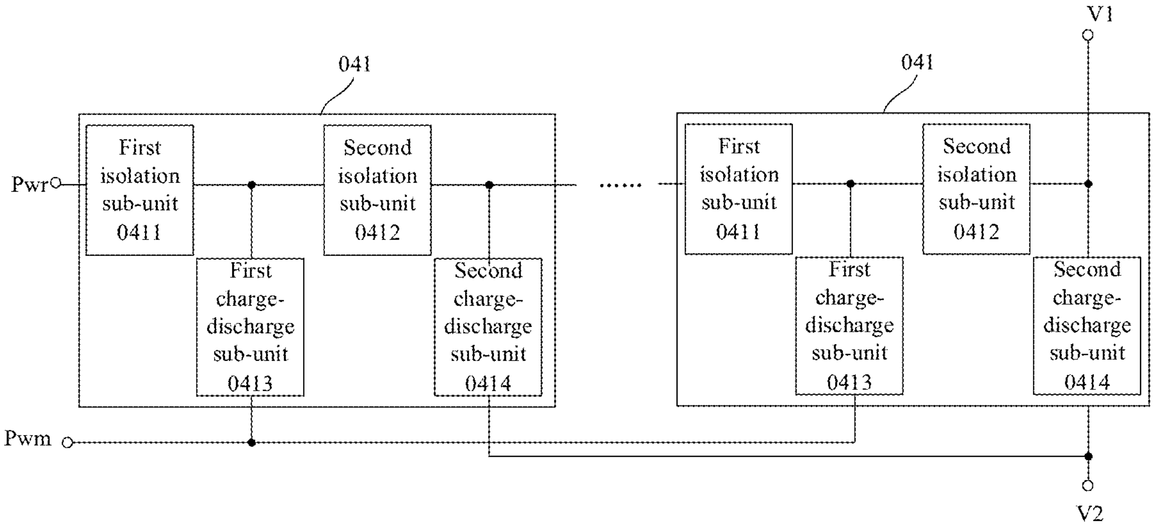
FIG. 9 is a structural schematic diagram of another power source providing sub-circuit according to an embodiment of the present disclosure.

FIG. 9 is a structural schematic diagram of another power source providing sub-circuit according to an embodiment of the present disclosure. As shown in FIG. 9, each stage of boost unit 041 may include a first isolation sub-unit 0411, a second isolation sub-unit 0412, a first charge-discharge sub-unit 0413, and a second charge-discharge sub-unit 0414.

In each stage of boost unit 041, an output terminal of the first isolation sub-unit 0411 is coupled to one end of the first charge-discharge sub-unit 0413 and an input terminal of the second isolation sub-unit 0412, an output terminal of the second isolation sub-unit 0412 is coupled to one end of the second charge-discharge sub-unit 0414, the other end of the first charge-discharge sub-unit 0413 is coupled to the signal supply terminal Pwm, and the other end of the second charge-discharge sub-unit 0414 is grounded.

An input terminal of the first isolation sub-unit 0411 in each other stage of boost unit 041 except the first-stage boost unit 041 is coupled to the output terminal of the second isolation sub-unit 0412 in a previous-stage boost unit 041, an input terminal of the first isolation sub-unit 0411 in the first-stage boost unit 041 is coupled to the power-line communication input pin Pwr, and the output terminal of the second isolation sub-unit 0412 in the last-stage boost unit 041 is further coupled to the first power source terminal V1.

Figure 10:
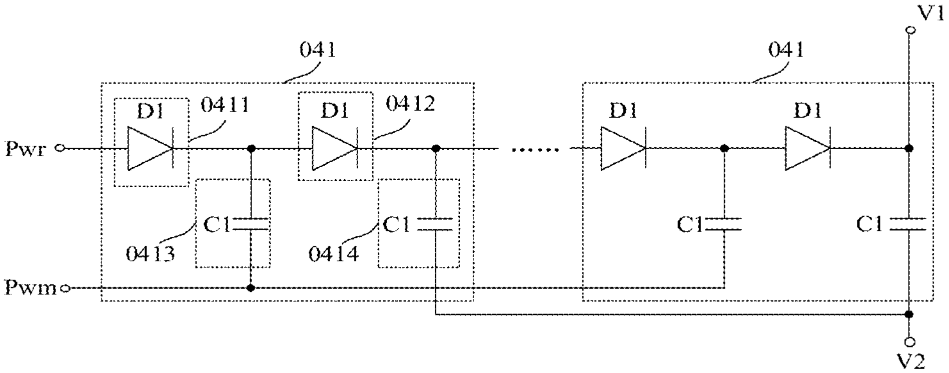
FIG. 10 is a structural schematic diagram of still another power source providing sub-circuit according to an embodiment of the present disclosure.
Figure 11:
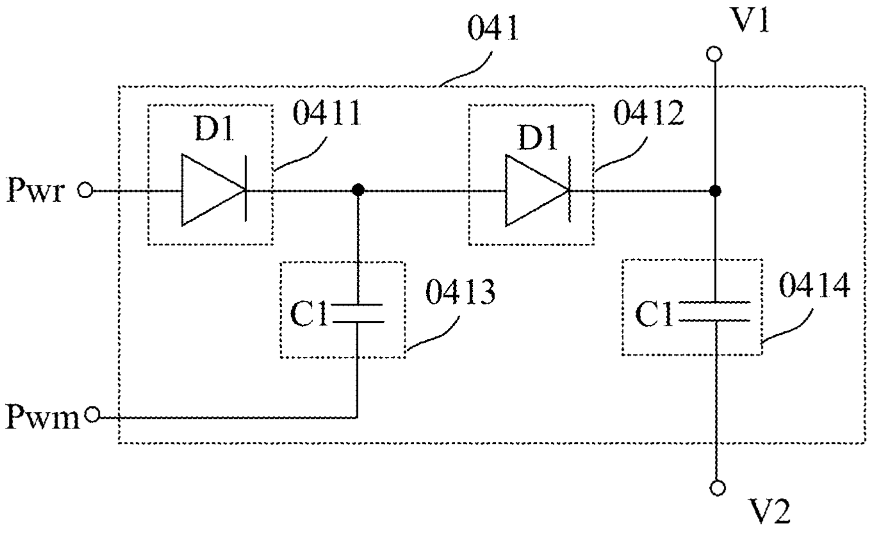
FIG. 11 is a structural schematic diagram of yet still another power source providing sub-circuit according to an embodiment the present disclosure.

By taking FIG. 8 and FIG. 9 as examples, FIG. 10 shows a structural schematic diagram of still another power source providing sub-circuit by taking that it only includes two stages of boost units 041 as an example, and FIG. 11 shows a structural schematic diagram of yet still another power source providing sub-circuit by taking that it includes one stage of boost unit 041 as an example. With reference to FIGS. 10 and 11, it can be seen that each of the first isolation sub-unit 0411 and the second isolation sub-unit 0412 may include an isolation diode D1. Each of the first charge-discharge sub-unit 0413 and the second charge-discharge sub-unit 0414 may include a charge-discharge capacitor C1. On this basis, the power source providing sub-circuit 04 may also be called a charge pump boost circuit.

Optionally, as described in the above embodiments, it can be seen that the potential Vpwr of the power communication signal is generally 4.5 V, and the minimum amplitude and the maximum amplitude of the potential Vpwm of the pulse width modulation signal provided by the signal supply terminal Pwm are generally 0 and 4.5 V respectively, that is, the pulse width modulation signal may be a high-frequency square-wave voltage signal ranging from 0 to 4.5 V. On this basis, in conjunction with the circuit shown in FIG. 10, the boost principle of the power source providing sub-circuit 04 is explained as follows.

For each stage of boost unit 041, when the potential Vpwm of the pulse width modulation signal is the low potential of 0, the power-line communication input pin Pwr may charge the charge-discharge capacitor C1 included in the first charge-discharge sub-unit 0413 through the isolation diode D1 included in the first isolation sub-unit 0411, and the voltage at two terminals of the charge-discharge capacitor C1 included in the first charge-discharge sub-unit 0413 is positive at the top and negative at the bottom and is 4.5V. When the potential Vpwm of the pulse width modulation signal is a high potential of 4.5V, the potential Vpwr of the received power communication signal and the potential Vpwm of the pulse-width modulation signal may be superimposed and a charge-discharge capacitor C1 included in the second charge-discharge sub-unit 0414 may be charged through the isolation diode D1 included in the second isolation sub-unit 0412. If the conduction voltage drop of the isolation diode D1 is ignored, it can be seen that in this case, the voltage at two terminals of the charge-discharge capacitor C1 included in the second charge-discharge sub-unit 0414 is 4.5V+4.5V=9V. In this way, the voltage doubling function is realized. If higher voltages are required, it can be seen that as shown in FIG. 10, the plurality of stages of boost units 041 are connected in series. For example, if it is necessary to provide the first power source signal at 25V to the first power source terminal V1, it is set that about five stages of boost units 041 are connected in series.

Optionally, in the embodiments of the present disclosure, the light emission control sub-circuit 01, the amplification sub-circuit 02, the low-grayscale control sub-circuit 03 and the power source providing sub-circuit 04 may be integrated. That is, they may be integrally disposed in one IC. In other words, compared with related technologies, the driving circuit 00 provided by the embodiments of the present disclosure may further include the amplification sub-circuit 02, the low-grayscale control sub-circuit 03 and the power source providing sub-circuit 04 in addition to the light emission control sub-circuit 01.

In conjunction with the above descriptions, it can be seen that in the embodiments of the present disclosure, when the display panel displays the L0 picture, the voltage which is greater than or equal to the voltage of the power supply signal provided by the power supply terminal VLED is input into the output pin Out of the light emission control sub-circuit 01, so that a positive voltage difference between the N and P electrodes of the plurality of light-emitting elements connected in series of the light-emitting unit group 101 is less than or equal to 0. Thus, the plurality of light-emitting elements connected in series cannot emit light, thereby solving the problem of the snowflake screen. In addition, it can also solve the problem of low-luminance display of the single light-emitting area caused by low impedance on a printed circuit board (FOB) on board, and the FOB may refer to a circuit board provided with the above light-emitting board 10 and its driving circuit 00.

In summary, the embodiments of the present disclosure provide a driving circuit. The driving circuit includes the light emission control sub-circuit, the amplification sub-circuit and the low-grayscale control sub-circuit. The light emission control sub-circuit may generate the driving signal and output the same from the output pin, so that the light-emitting unit group coupled to the output pin emits light based on the driving signal and the power supply signal provided by the power supply terminal. The amplification sub-circuit may amplify the reference power source signal provided by the reference power source terminal to have a voltage not less than the voltage of the power supply signal and transmit the amplified reference power source signal to the low-grayscale control sub-circuit. The low-grayscale control sub-circuit may control a connection and a disconnection between the amplification sub-circuit and the output pin under the control of the enabling control terminal. In this way, by flexibly setting the signal provided by the enabling control terminal, when the light-emitting board including the light-emitting unit group enters the black-frame insertion state, the amplified reference power source signal can be further transmitted to the light-emitting unit group, so that the voltage of the first electrode of the light-emitting unit group is greater than the voltage of the second electrode thereof and the light-emitting unit group cannot emit light. Thus, the light-emitting board is prevented from having the phenomenon of low-luminance display and it can be ensured that the display panel has a relatively good display effect.

Figure 12:
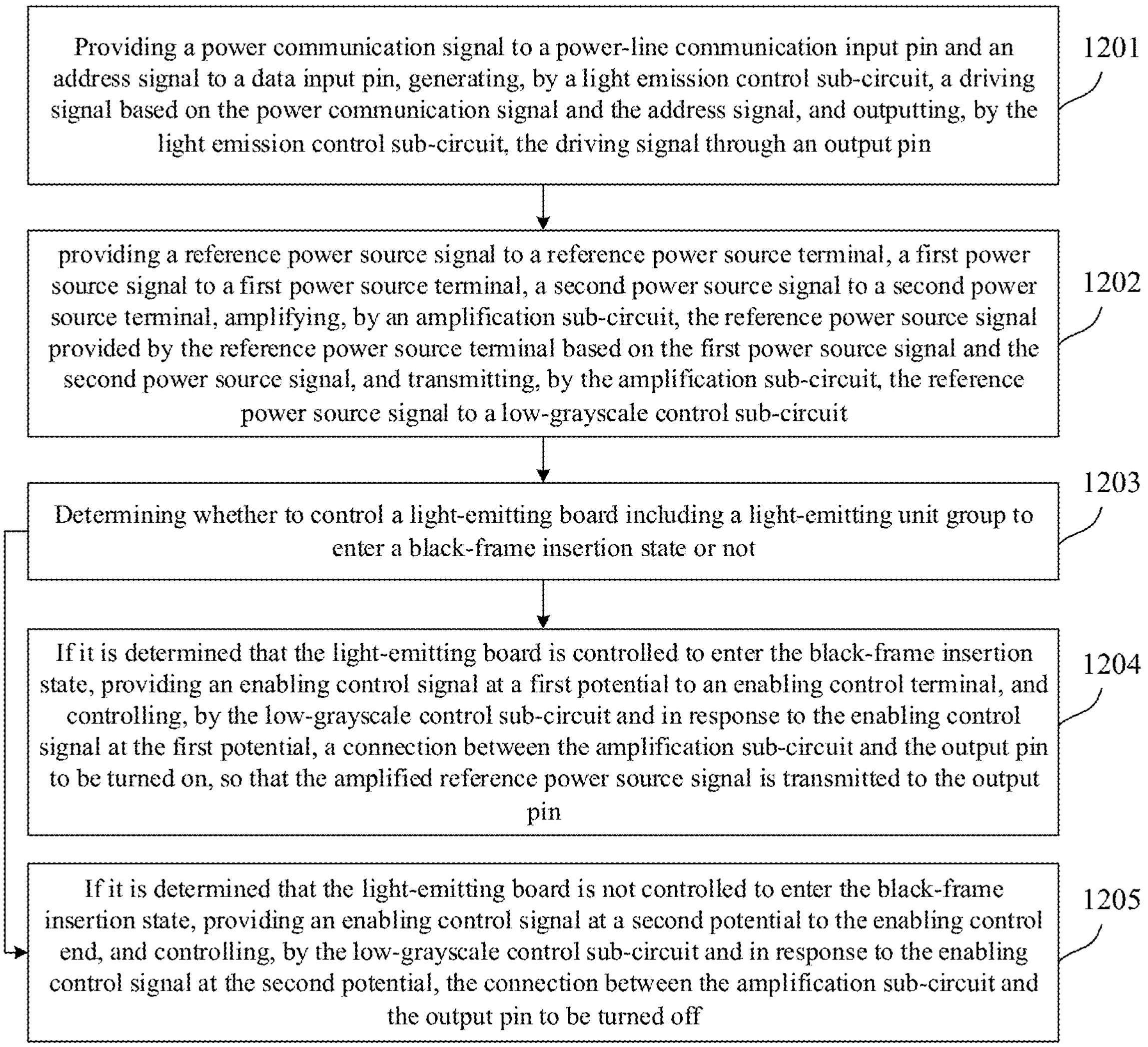
FIG. 12 is a flowchart of a driving method according to an embodiment of the present disclosure.

FIG. 12 shows a driving method according to an embodiment of the present disclosure, which may be applied to the driving circuit 00 as described in the above embodiment. As shown in FIG. 12, the method includes the following steps.

In step 1201, a power communication signal is provided to a power-line communication input pin and an address signal is provided to a data input pin, and a light emission control sub-circuit generates a driving signal based on the power communication signal and the address signal, and outputs the driving signal through an output pin.

In step 1202, a reference power source signal is provided to a reference power source terminal, a first power source signal is provided to a first power source terminal, a second power source signal is provided to a second power source terminal, and an amplification sub-circuit amplifies the reference power source signal provided by the reference power source terminal based on the first power source signal and the second power source signal, and transmits the amplified reference power source signal to a low-grayscale control sub-circuit.

In step 1203, whether to control a light-emitting board including a light-emitting unit group to enter a black-frame insertion state or not is determined.

In step 1204, if it is determined that the light-emitting board is controlled to enter the black-frame insertion state, an enabling control signal at a first potential is provided to an enabling control terminal, and the low-grayscale control sub-circuit controls, in response to the enabling control signal at the first potential, a connection between the amplification sub-circuit and the output pin to be turned on, so that the amplified reference power source signal is transmitted to the output pin.

In step 1205, if it is determined that the light-emitting board is not controlled to enter the black-frame insertion state, an enabling control signal at a second potential is provided to the enabling control end, and the low-grayscale control sub-circuit controls, in response to the enabling control signal at the second potential, the connection between the amplification sub-circuit and the output pin to be turned off.

Optionally, as described in the above embodiments, step 1201 above that the light emission control sub-circuit generates the driving signal based on the power communication signal and the address signal may include: the light emission control sub-circuit generates a pulse width signal and a luminance control signal based on the power communication signal and the address signal, and generates the driving signal based on the pulse width modulation signal and the luminance control signal. In addition, with reference to the time sequence diagram of the signal terminal shown in FIG. 13 and the descriptions in the above embodiments, it can be seen that the light emission control sub-circuit 01 may further has a clock signal DCLK with a fixed frequency and duty ratio, and the clock signal DCLK is generated by the oscillator (OSC) 14. On this basis, step 1203 above that whether to control a light-emitting board including a light-emitting unit group to enter a black-frame insertion state or not is determined may include:

if the pulse width modulation signal generated by the light emission control sub-circuit is at the second potential within a plurality of cycles of the clock signal DCLK, that the light-emitting board including the light-emitting unit group is controlled to enter the black-frame insertion state is determined. For example, the number of the plurality of cycles may be greater than or equal to 5. That is, if the pulse width modulation signal generated by the light emission control sub-circuit is at the second potential within five or more cycles of the clock signal DCLK, that the light-emitting board including the light-emitting unit group enters the black-frame insertion state may be determined. The number of the plurality of cycles shown in FIG. 13 is equal to 5.

Figure 13:
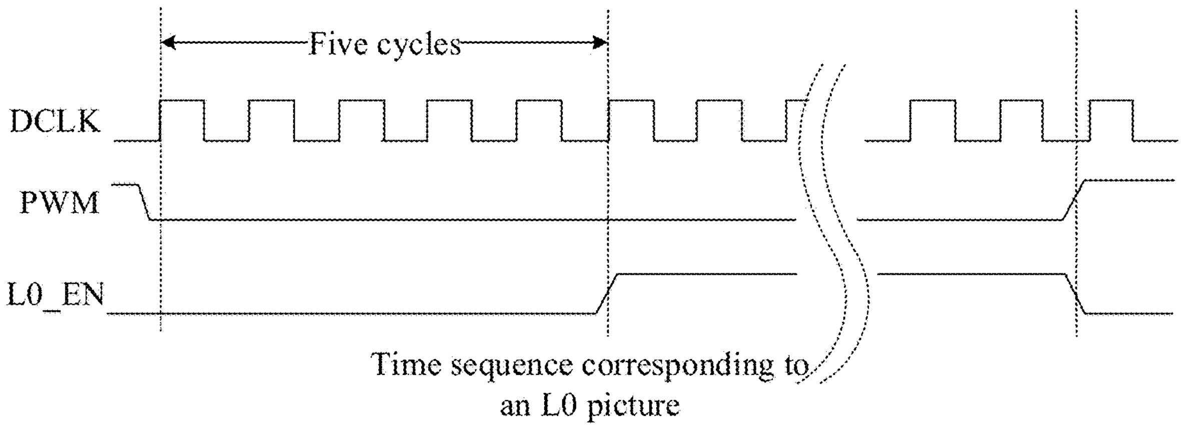
FIG. 13 is a time sequence diagram of a signal terminal in a driving circuit according to an embodiment of the present disclosure.

By taking that the switching transistor T1 shown in FIG. 5 is an N-type transistor as an example, FIG. 13 further shows a time sequence of an enabling control signal provided by the enabling control terminal L0_EN. With reference to FIG. 13, it can be seen that on the basis that the pulse width modulation signal generated by the light emission control sub-circuit is at a low potential constantly within 5 cycles of the clock signal DCLK, it may be determined that the light-emitting board enters the black-frame insertion state. In this case, next, the potential of the enabling control signal provided by the enabling control terminal L0_EN may jump to a high potential, so that the switching transistor T1 is turned on and the amplified reference power source signal is transmitted to the light-emitting unit group in the light-emitting board. In this case, the light-emitting unit group cannot emit light. In this way, the light-emitting board including the light-emitting unit group is prevented from having the phenomenon of low-luminance display. By setting the above time sequence, the situation that the low-grayscale control sub-circuit 03 is mistakenly triggered to be conducted in the black-frame insertion state can be avoided, and thus the display panel can be prevented from having the phenomenon of unreliable unexpected grayscale or screen flickering after displaying the L0 picture.

In summary, the embodiments of the present disclosure provide a driving method. In this method, the light emission control sub-circuit may generate the driving signal and output the same from the output pin, so that the light-emitting unit group coupled to the output pin emits light based on the driving signal and the power supply signal provided by the power supply terminal coupled to the positive electrode. The amplification sub-circuit may amplify the reference power source signal provided by the reference power source terminal to be greater than or equal to the voltage of the power supply signal and transmit the amplified reference power source signal to the low-grayscale control sub-circuit. The low-grayscale control sub-circuit may control a connection between the amplification sub-circuit and the output pin to be turned on when the light-emitting board including the light-emitting unit group enters the black-frame insertion state, so that the reference power source signal with the amplified potential may be further transmitted to the light-emitting unit group, the voltage of a first electrode of the light-emitting unit group is greater than the voltage of a second electrode thereof and hence the light-emitting unit group cannot emit light. Thus, the light-emitting board is prevented from having the phenomenon of low-luminance display and it can be ensured that the display panel has a relatively good display effect.

It should be noted that specific control modes of above respective steps may refer to those described at the device side and are not repeated at the method side.

Figure 14:
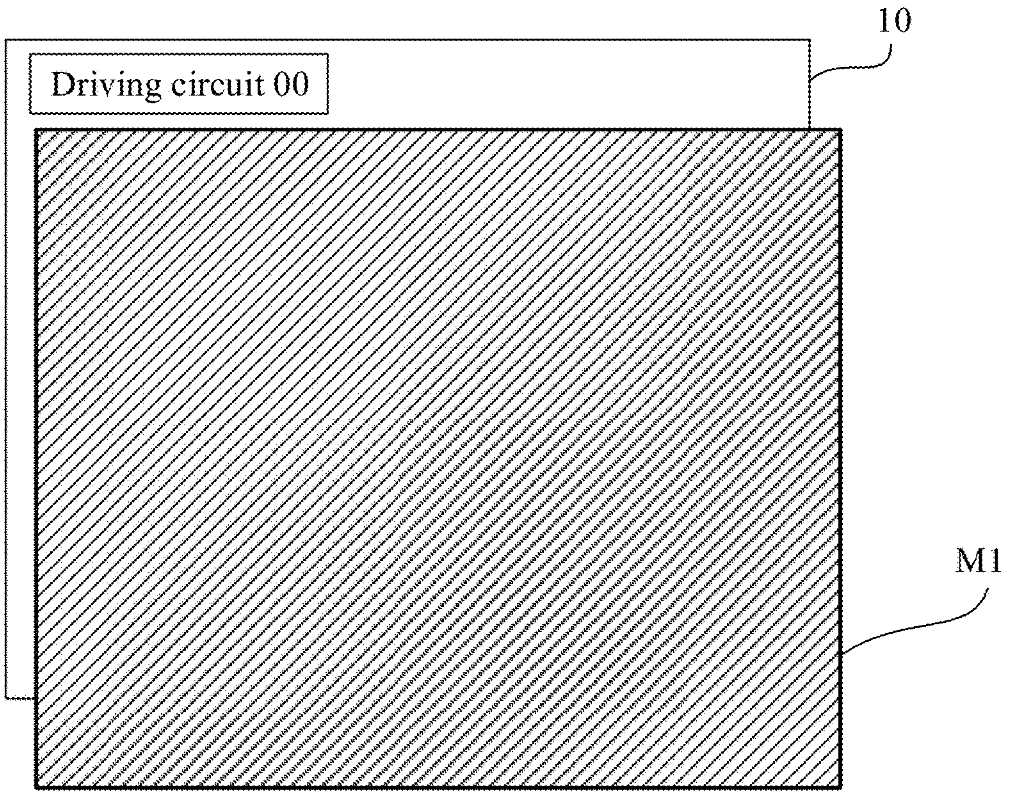
FIG. 14 is a structural schematic diagram of a display device according to an embodiment of the present disclosure.

FIG. 14 is a structural schematic diagram of a display device according to an embodiment of the present disclosure. As shown in FIG. 14, the display device includes a display panel M1, a light-emitting board 10 disposed on one side of the display panel M1, and the driving circuit 00 as descried in the above embodiments.

It should be noted that in an LCD device, that the light-emitting board 10 is disposed on one side of the display panel M1 generally means that the light-emitting board 10 is disposed on a non-display side of the display panel M1. The light-emitting board 10 may be used as a backlight source of the LCD device to provide backlight for the LCD device, so that the LCD device displays normally.

In conjunction with FIG. 2 and FIG. 3 above, it can be seen that the light-emitting board 10 may include a light-emitting unit group 101. The driving circuit 00 may be coupled to the light-emitting unit group 101 and configured to drive the light-emitting unit group 101 to emit light.

In addition, with continued reference to FIG. 2 and FIG. 3, it can further be seen that the light-emitting board 10 may include a plurality of light-emitting unit groups 101. Each light-emitting unit group 101 may include a plurality of light-emitting elements L connected in series. On this basis, the display device may include a plurality of driving circuits 00 in one-to-one correspondence with the plurality of light-emitting unit groups 101.

The output pin Out of each of the driving circuits may be coupled to first electrodes (such as negative electrodes) of the plurality of light-emitting elements L connected in series in a corresponding light-emitting unit group 101, second electrodes (such as positive electrodes) of the plurality of light-emitting elements L connected in series in each light-emitting unit group 101 may also be coupled to a power supply terminal VLED, and the plurality of light-emitting elements L may be configured to emit light based on a driving signal output from the output pin Out of the driving circuit 00 and a power supply signal provided by the power supply terminal VLED. FIG. 14 only schematically shows one driving circuit 00.

Figure 15:
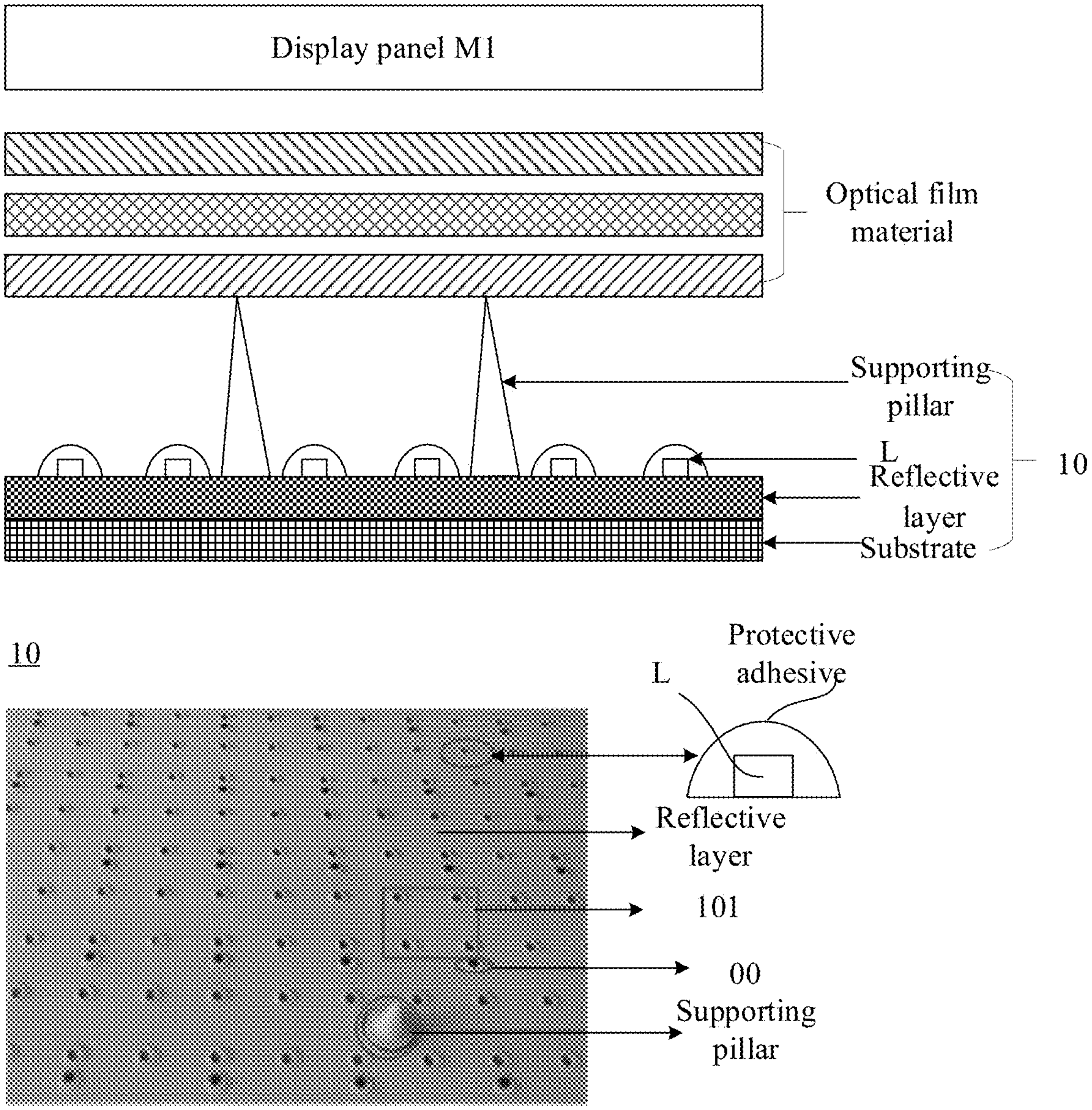
FIG. 15 is a sectional schematic diagram of a display device according to an embodiment of the present disclosure.

Optionally, as described in the above embodiments, it can further be seen that the light-emitting element L described in the embodiments of the present disclosure may include a mini light-emitting diode (mini LED). On this basis, FIG. 15 shows a structural schematic diagram of a display device. With reference to FIG. 15, it can be seen that the display device includes a light-emitting board 10, an optical film material and a display panel M1 from bottom to top. The optical film material may include a quantum dot film, a diffusion sheet, and a composite film.

In conjunction with the schematic product diagram of the light-emitting board 10 shown in FIG. 15, it can be seen that the light-emitting board 10 may include a substrate with a line, a reflective layer, a plurality of LEDs, a protective adhesive covering each light-emitting element L, a support column, and a plurality of driving circuits 00. The schematic product diagram of the FIG. 15 also schematically identifies the division of the light-emitting unit group 101. Optionally, the reflective layer may include a white oil or reflective sheet.

Optionally, the display device may be any product or component having a display function, such as an LCD display device, electronic paper, a mobile phone, a tablet computer, a television, a display, a laptop computer or a navigator.

It should be understood that the terms used in the embodiments of the present disclosure are merely intended to explain the embodiments of the present disclosure, instead of limiting the present disclosure. Unless defined otherwise, the technical terms or scientific terms used in the embodiments of the present disclosure shall have the general meaning understood by persons of ordinary skill in the art. For example, the terms "first", "second", "third" and similar terms used in the embodiments of the present disclosure do not denote any order, quantity, or importance, and are merely used to distinguish between different components.

Likewise, the term "one" or "a/an" and similar terms denote at least one, instead of limiting the quantity.

The word "comprise" or "include" and similar terms mean that the element or object appearing before the word "comprise" or "include" covers the listed elements, objects and equivalents thereof appearing after the word "comprise" or "include", without excluding other elements or objects.

The term "connection" or "connected" and similar terms are not limited to physical or mechanical connection, and may include electrical connection and the connection may be direct or indirect.

The terms "upper", "lower", "left", right" and the like are used to indicate a relative positional relationship. When an absolute position of the described object changes, the relative positional relationship is also changed accordingly.

The above descriptions are merely optional embodiments of the present disclosure, and are not intended to limit the present disclosure. Any modifications, equivalent replacements, improvements and the like made within the spirit and principles of the present disclosure shall be included within the scope of protection of the present disclosure.

What is claimed is:

1. A driving circuit, having a power-line communication input pin, a data input pin and an output pin and comprising a light emission control sub-circuit, an amplification sub-circuit and a low-grayscale control sub-circuit, wherein the light emission control sub-circuit is respectively coupled to the power-line communication input pin, the data input pin and the output pin, the light emission control sub-circuit is configured to generate a driving signal based on a power communication signal provided by the power-line communication input pin and an address signal provided by the data input pin, and output the driving signal through the output pin, the output pin is configured to be coupled to a first electrode of a light-emitting unit group, and a second electrode of the light-emitting unit group is coupled to a power supply terminal;

the amplification sub-circuit is respectively coupled to a reference power source terminal, a first power source terminal, a second power source terminal and the low-grayscale control sub-circuit, and the amplification sub-circuit is configured to amplify a reference power source signal provided by the reference power source terminal based on a first power source signal provided by the first power source terminal and a second power source terminal provided by the second power source terminal, and transmit the amplified reference power source signal to the low-grayscale control sub-circuit, a voltage of the amplified reference power source signal being not less than a voltage of a power supply signal provided by the power supply terminal; and the low-grayscale control sub-circuit is further respectively coupled to an enabling control terminal and the output pin, and the low-grayscale control sub-circuit is configured to control a connection and a disconnection between the amplification sub-circuit and the output pin based on an enabling control signal provided by the enabling control terminal.

2. The driving circuit according to claim 1, wherein the amplification sub-circuit comprises a first resistor, a second resistor, a third resistor and an amplifier, wherein one end of the first resistor is coupled to the reference power source terminal and another end of the first resistor is coupled to a positive input terminal of the amplifier;

one end of the second resistor is coupled to a negative input terminal of the amplifier and another end of the second resistor is coupled to an output terminal of the amplifier;

one end of the third resistor is coupled to the negative input terminal of the amplifier and another end of the third resistor is coupled to the second power source terminal;

the output terminal of the amplifier is coupled to the low-grayscale control sub-circuit, and the amplifier is further coupled to the first power source terminal and the second power source terminal.

3. The driving circuit according to claim 1, wherein the low-grayscale control sub-circuit comprises a switching transistor, wherein a control electrode of the switching transistor is coupled to the enabling control terminal, a first electrode of the switching transistor is coupled to the amplification sub-circuit, and a second electrode of the switching transistor is coupled to the output pin.

4. The driving circuit according to claim 3, wherein the switching transistor is an N-type transistor.

5. The driving circuit according to claim 1, further having a ground pin, wherein the light emission control sub-circuit is further coupled to a base power source terminal and the ground pin, and the light emission control sub-circuit is configured to generate a driving signal based on the power communication signal, the address signal, a base power source signal provided by the base power source terminal, and a signal provided by the ground pin; and the reference power source terminal is used as the base power source terminal; and the second power source terminal is coupled to the ground pin.

6. The driving circuit according to claim 1, further comprising a power source providing sub-circuit, wherein the power source providing sub-circuit is respectively coupled to the power-line communication input pin, a signal supply terminal and the first power source terminal, and the power source providing sub-circuit is configured to transmit the first power source signal to the first power source terminal based on the power communication signal and a signal provided by the signal supply terminal, wherein the signal provided by the signal supply terminal is a pulse width modulation signal, and a voltage of the first power source signal is not less than the voltage of the amplified reference power source signal.

7. The driving circuit according to claim 6, wherein the power source providing sub-circuit comprises a plurality of stages of boost units connected in series, wherein each of the plurality of stages of boost units comprises: a first isolation sub-unit, a second isolation sub-unit, a first charge-discharge sub-unit, and a second charge-discharge sub-unit;

in a stage of the plurality of stages of boost units, an output terminal of the first isolation sub-unit is respectively coupled to one end of the first charge-discharge sub-unit and an input terminal of the second isolation sub-unit, an output terminal of the second isolation sub-unit is coupled to one end of the second charge-discharge sub-unit, another end of the first charge-discharge sub-unit is coupled to the signal supply terminal, and another end of the second charge-discharge sub-unit is grounded; and an input terminal of the first isolation sub-unit in each other stage of boost unit except the first-stage boost unit is coupled to the output terminal of the second isolation sub-unit in a previous-stage boost unit, an input terminal of the first isolation sub-unit in the first-stage boost unit is coupled to the power-line communication input pin, and the output terminal of the second isolation sub-unit in a last-stage boost unit is further coupled to the first power source terminal.

8. The driving circuit according to claim 7, wherein each of the first isolation sub-unit and the second isolation sub-unit comprises an isolation diode; and each of the first charge-discharge sub-unit and the second charge-discharge sub-unit comprises a charge-discharge capacitor.

9. The driving circuit according to claim 6, wherein the light emission control sub-circuit, the amplification sub-circuit, the low-grayscale control sub-circuit, and the power source providing sub-circuit are integrated.

10. A driving method, applied to the driving circuit according to claim 1, comprising:

providing a power communication signal to a power-line communication input pin, providing an address signal to a data input pin, generating, by a light emission control sub-circuit, a driving signal based on the power communication signal and the address signal, and outputting, by the light emission control sub-circuit, the driving signal through an output pin;

providing a reference power source signal to a reference power source terminal, providing a first power source signal to a first power source terminal, providing a second power source signal to a second power source terminal, and amplifying, by an amplification sub-circuit, the reference power source signal provided by the reference power source terminal based on the first power source signal and the second power source signal, and transmitting, by the amplification sub-circuit, the amplified reference power source signal to a low-grayscale control sub-circuit;

determining whether to control a light-emitting board comprising a light-emitting unit group to enter a black-frame insertion state or not;

if it is determined that the light-emitting board is controlled to enter the black-frame insertion state, providing an enabling control signal at a first potential to an enabling control terminal, and controlling, by the low-grayscale control sub-circuit and in response to the enabling control signal at the first potential, a connection between the amplification sub-circuit and the output pin to be turned on, so that the amplified reference power source signal is transmitted to the output pin; and if it is determined that the light-emitting board is not controlled to enter the black-frame insertion state, providing an enabling control signal at a second potential to the enabling control end, and controlling, by the low-grayscale control sub-circuit and in response to the enabling control signal at the second potential, the connection between the amplification sub-circuit and the output pin to be turned off.

11. The driving method according to claim 10, wherein said generating, by the light emission control sub-circuit, the driving signal based on the power communication signal and the address signal comprises:

generating, by the light emission control sub-circuit, a pulse width modulation signal and a luminance control signal based on the power communication signal and the address signal, and generating, by the light emission control sub-circuit, the driving signal based on the pulse width modulation signal and the luminance control signal; and wherein the light emission control sub-circuit has a clock signal with a fixed duty ratio; and said determining whether to control the light-emitting board comprising the light-emitting unit group to enter the black-frame insertion state or not comprises:

if the pulse width modulation signal generated by the light emission control sub-circuit is at a second potential within a plurality of cycles of the clock signal, determining that the light-emitting board comprising the light-emitting unit group is controlled to enter the black-frame insertion state.

12. The driving method according to claim 11, wherein a number of the plurality of cycles is greater than or equal to 5.

13. A display device, comprising a display panel, a light-emitting board disposed on one side of the display panel, and the driving circuit according to claim 1, wherein the light-emitting board comprises a light-emitting unit group; and the driving circuit is coupled to the light-emitting unit group and configured to drive the light-emitting unit group to emit light.

14. The display device according to claim 13, wherein the light-emitting board comprises a plurality of light-emitting unit groups, each of the plurality of light-emitting unit groups comprising a plurality of light-emitting elements connected in series; and the display device comprises a plurality of driving circuits in one-to-one correspondence with the plurality of light-emitting unit groups, wherein an output pin of each of the plurality of driving circuits is coupled to first electrodes of the plurality of light-emitting elements connected in series in a corresponding light-emitting unit group, second electrodes of the plurality of light-emitting elements connected in series in each of the plurality of light-emitting unit groups are coupled to a power supply terminal, and the plurality of light-emitting elements connected in series is configured to emit light based on a driving signal output by the output pin of a corresponding driving circuit and a power supply signal provided by the power supply terminal.

15. The display device according to claim 14, wherein each of the light-emitting elements comprises a mini light-emitting diode.

16. The display device according to claim 13, wherein the amplification sub-circuit comprises a first resistor, a second resistor, a third resistor and an amplifier, wherein one end of the first resistor is coupled to the reference power source terminal and another end of the first resistor is coupled to a positive input terminal of the amplifier;

one end of the second resistor is coupled to a negative input terminal of the amplifier and another end of the second resistor is coupled to an output terminal of the amplifier;

one end of the third resistor is coupled to the negative input terminal of the amplifier and another end of the third resistor is coupled to the second power source terminal;

the output terminal of the amplifier is coupled to the low-grayscale control sub-circuit, and the amplifier is further coupled to the first power source terminal and the second power source terminal.

17. The display device according to claim 13, wherein the low-grayscale control sub-circuit comprises a switching transistor, wherein a control electrode of the switching transistor is coupled to the enabling control terminal, a first electrode of the switching transistor is coupled to the amplification sub-circuit, and a second electrode of the switching transistor is coupled to the output pin.

18. The display device according to claim 17, wherein the switching transistor is an N-type transistor.

19. The display device according to claim 13, further having a ground pin, wherein the light emission control sub-circuit is further coupled to a base power source terminal and the ground pin, and the light emission control sub-circuit is configured to generate a driving signal based on the power communication signal, the address signal, a base power source signal provided by the base power source terminal, and a signal provided by the ground pin; and the reference power source terminal is used as the base power source terminal; and the second power source terminal is coupled to the ground pin.

20. The display device according to claim 13, wherein the driving circuit further comprises a power source providing sub-circuit, wherein the power source providing sub-circuit is respectively coupled to the power-line communication input pin, a signal supply terminal and the first power source terminal, and the power source providing sub-circuit is configured to transmit the first power source signal to the first power source terminal based on the power communication signal and a signal provided by the signal supply terminal, wherein the signal provided by the signal supply terminal is a pulse width modulation signal, and a voltage of the first power source signal is not less than the voltage of the amplified reference power source signal.

* * * * *